United States Patent
Hsiao et al.

[11] Patent Number: 5,878,414
[45] Date of Patent: Mar. 2, 1999

[54] CONSTRUCTING A TRANSACTION SERIALIZATION ORDER BASED ON PARALLEL OR DISTRIBUTED DATABASE LOG FILES

[75] Inventors: Hui-I Hsiao; Ming-Ling Lo, both of Yorktown Heights, N.Y.

[73] Assignee: International Business Machines Corp., Armonk, N.Y.

[21] Appl. No.: 871,001

[22] Filed: Jun. 6, 1997

[51] Int. Cl.[6] .................................................. G06F 17/30
[52] U.S. Cl. .................. 707/8; 707/1; 707/3; 707/9; 707/10; 395/183.01; 395/726
[58] Field of Search ................. 707/8, 1, 9, 10, 707/3; 395/183.01, 726; 600/316; 370/259

[56] References Cited

U.S. PATENT DOCUMENTS

| | | | |
|---|---|---|---|
| 5,056,086 | 10/1991 | Libonati | 370/259 |
| 5,596,754 | 1/1997 | Lomet | 395/726 |
| 5,630,048 | 5/1997 | La Joie et al. | 395/183.01 |

OTHER PUBLICATIONS

P. A. Bernstein, V. Hadzilacos, & N. Goodman, *Concurrency Control and Recovery in Database Systems*, Addison–Wesley (1987); pp. 49–58,59–60, 226–234.

*Primary Examiner*—Thomas G. Black
*Assistant Examiner*—Diane D. Mizrali
*Attorney, Agent, or Firm*—Kevin M. Jordan; Baker & Botts, L.L.P.

[57] ABSTRACT

A method to construct a transaction serialization order based on parallel or distributed database log files that connects the log files into a network and merges the network into a sequence. Only vote symbols and commit symbols are considered in the construction and a protocol of a transaction's vote appearing before a transaction's commit is enforced. The log files are connected by making links between commit symbols of the same transactions in different log files. The method identifies ambiguities in the orders of the individual log files, called commit symbol cycles, and resolves them by breaking an unsupported segment of the cycle and sliding the segment's forwardmost commit symbol backward to a position immediately prior to the first commit symbol on that segment. By doing so, the serialization implication of an individual log file may be changed, but the overall serialization implication of the database remains intact. Using an iterative process, this method can order the log files in one pass-through.

13 Claims, 5 Drawing Sheets

CONSTRUCTING A TRANSACTION SERIALIZATION ORDER BASED ON PARALLEL OR DISTRIBUTED DATABASE LOG FILES

RELATED APPLICATION

This application is related to a co-pending application by the same inventors entitled "Merging Database Log Files Through Log Transformations," pending U.S. application Ser. No. 08/870,991, filed Jun. 6, 1997.

BACKGROUND OF THE INVENTION

1. Field of the Invention

This invention is related to computers and computer systems, and in particular to database management systems (DBMS).

2. Description of the Related Art

A database management system keeps track of changes made to a database during its lifetime. These changes are called "transactions" and each transaction is made up of operations such as insert, update, and delete. The operations are recorded in a "log file" in the order in which the operations are performed in the system. This log file may contain entries of operations performed from the time the database was created or from the time the database was last backed up until the present.

With the increasing emphasis in the database community on historical data, data warehousing, and updating remote or warehouse copies of a database, there is a need to develop a global log file that, when applied to a copy of a database, recreates the results of changes to the original database. As part of that task, it is necessary to first reconstruct the original order of transactions. For serial database systems, the transaction order can easily be inferred by examining the log files for each transaction; creating a global log file in that case is trivial. However, in parallel or distributed database systems, which consist of nodes each of which performs a part of a transaction, creating a global log file is much more complex. In such systems, after all the nodes have finished processing their parts of the transaction, the results are put together to complete the transaction. Each node has its own log file associated with it, often called a "local log file," in which all of the operations performed by the node are recorded in the order completed. On a "share-nothing" model of a parallel or distributed database system, each node operates on a partition of the database; the problem of constructing a global transaction order is especially complex in this case because any data item in the database belongs to exactly one partition and thus to exactly one node. FIG. 1 depicts the architecture of a share-nothing parallel database system in which the network 9 is made up of processing nodes 1,2,3,4 each respectively associated with partitions 5,6,7,8.

In order to better regulate the management of data, parallel or distributed database systems often operate under two protocols. The first is a "two-phase commit protocol," involving a transaction coordinator on some node and transaction participants on that node and others, in which each participant signals to the coordinator when the participant has completed its part of the transaction (first phase), and the coordinator signals to the participants whether the transaction should be executed or not (second phase). Specifically, the coordinator decides on which nodes lie the data items needed to complete the transaction and assigns a participant on each node to complete the operations necessary for each node. When each participant completes its part of the transaction, it sends a "vote" to the coordinator telling the coordinator that it has completed its work and requesting the coordinator to decide whether it should commit to the work it has done. After the coordinator receives a vote from all of the participants, it sends either a "commit" or an "abort" to each participant. The participants then commit to or abort their part of the transaction accordingly. For any transaction i, $V_i$ denotes its vote operation and $C_i$ denotes its commit operation. For these types of database systems, the local log files record the votes, commits, and aborts as well as the inserts, updates, and deletes. Thus, the two-phase commit protocol requires that in any node, the vote for a transaction will necessarily precede that transaction's commit or abort.

The second protocol under which these database systems operate is a "strict two-phase locking protocol" which controls and locks resources needed to complete database transactions. In general, a locking protocol requires the DBMS to lock resources needed to complete a transaction so that only that transaction can access the resources at any one time. A "two-phase locking protocol," consisting of a "locking phase" and a "releasing phase," restricts the acquisition and release of locks in such a way that all the locks must first be acquired for the transaction before any lock is released, and, once a lock is released, no other locks can be acquired for that transaction. A more stringent requirement results in the "strict two-phase locking protocol" where all the locks must first be acquired for the transaction and no locks are released until the commit or abort is processed for that transaction. In a sharenothing model of a parallel or distributed database system, each node independently abides by the strict two-phase locking protocol and thus requires that when two transactions i and j need to access the same resources on that node, the transaction that acquires the locks first will be committed to or aborted before the other transaction. Thus, if transaction i acquires the locks first, in the log file for that node the commit or the abort of i will precede the commit or abort of j.

In constructing a global transaction order, a set of transactions can be arranged into a "serialization order" which can either be a total order (a sequence relating any two transactions in the set) or a partial order (a sequence in which some transactions may be related to others but not necessarily). The term "serialization order" can also be used to describe the order in which two transactions i and j appear in the total or partial order. Related to "serialization order" is a "serialization requirement" which takes effect when a DBMS performs its operations so that it is only meaningful to view one transaction as preceding another. This requirement is related to the strict two-phase locking protocol described above in that if two transactions need to access a common data item, the database system will grant the lock to the data item first to one transaction and then to the other. In such a case there is a "serialization requirement" between the two transactions that "requires" the transaction that acquired the lock first to be ordered before the other transaction. Finally, each log file has a "serialization implication" which is made up of information regarding the serialization requirement carried by the system. This information includes the records of the sequence and type of operations performed on its associated node, together with the semantics of the system in which the operations are executed.

The combination of all the local log files in the system reflects the history of the entire database. In constructing a global order at some later time, only the local log files exist. The most obvious solutions to this delayed ordering problem are to examine either the timestamp information for each transaction or the data items accessed by each transaction, information that may be recorded in the local log files. However, in practice these methods do not work very well because global timestamps are not always available in every DBMS and examining data items accessed by each transaction involves too many log entries and a complex analysis.

In situations such as these when timestamp information or information relating to each data item is not available, one method used to construct a global order is to examine the order of commit entries in the local log files. However, the commit entries alone do not provide enough information for constructing a global transaction order. In a parallel or distributed database system, a database node records its commit entries in its log file in the order it processes them, not in the order imposed by the system serialization requirement. Thus, for two transactions i and j whose commit entries are recorded in the same local log file, it is possible that (1) i must be serialized before j; (2) j must be serialized before i; or (3) no serialization requirement exists between i and j. In addition, the commit entries of two transactions have several properties that may lead to an ambiguous ordering. First, the order of two commit entries in the log file does not necessarily imply their serialization requirement because the commit entry of one transaction may precede that of another in some log file simply because it is processed earlier than the other, and the two transactions may not access any common data item at all. Second, two different log files may record the commit entries of the same two transactions in different orders. Thus, examining the positions of commit entries in the log files alone does not provide enough information to construct a global serialization order.

This lack of information creates local log files that are often ambiguous, and it is difficult to infer a global order merely by examining the order of the individual commit operations in each local log file. Up to now there been no method to construct a global order from local log files where the construction is performed some time after the log files have been created and can be completed on the full log file in one pass-through.

SUMMARY OF THE INVENTION

In a parallel or distributed database system, the present invention constructs a global transaction order by examining the relative pattern of vote symbols, $V_i$, and commit symbols, $C_i$, in the local log files, and enforcing an ordering of "transaction i before transaction j" when there is a "relative pattern" of $C_i$-$V_j$-$C_j$ in some local log file. A "relative pattern" of a sequence of symbols, in this case $C_i$-$V_j$-$C_j$, only means that $V_j$ comes somewhere between $C_i$ and $C_j$ in the sequence. It does not mean $C_i$ is the symbol immediately preceding $V_j$ or that $V_j$ immediately precedes $C_j$. The present invention first creates a network of the different local log files, $L_1$, $L_2$, etc., by connecting $C_1$ in $L_1$ to the $C_1$'s in the other local log files, then $C_2$ in $L_1$ to the $C_2$'s in other local log files, and then the other $C_1$'s in a similar manner. Next, the method resolves ambiguities in the local log files called "commit symbol cycles" by employing a novel submethod called "commit symbol sliding." After each cycle is resolved, the method merges the network into one sequence.

The basic mechanism used to construct a global transaction order is as follows. Given a set of local log files, for any two transactions i and j recorded in any log file, the pattern $C_i$-$V_j$-$C_j$ requires i to be ordered before j in the global transaction order. This method works correctly because it has the following properties:

1. If $C_i$-$V_j$-$C_j$ appears in one local log file, $C_j$-$V_i$-$C_i$ will never appear in any other local log file. Thus, the order previously determined will never have to change.
2. If the system has a serialization requirement of i before j, then there is a relative pattern of $C_i$-$V_j$-$C_j$ in at least one local log file.
3. If there is a relative pattern $C_i$-$V_j$-$C_j$ in some local log files, then either the serialization requirement between transactions i and j is i before j, or there is no serialization requirement at all. In either case, it is safe to order i before j.

These properties lead to the following conclusions. First, given a set of local log files, if after examining the relative patterns of the vote and commit entries in some local log file the pattern $C_i$-$V_j$-$C_j$ appears, their order is recorded as i before j in the global order. Second, if in a local log file any pattern other than $C_i$-$V_j$-$C_j$ appears, this information is disregarded. Thus using commit symbols as the main marker of the ordering information, their positions in local log files are adjusted as necessary until every pair of transactions has the same order of commit symbols in all local log files in which they appear. Then the local log files are easily merged to produce a global order.

The present invention is novel because it constructs a global transaction order by (1) examining only the relative positions of the vote and commit operations of committed transactions, ignoring operations associated with aborted transactions; (2) examining only each vote or commit symbol's transaction ID, not any other information regarding the data items recorded in the log entries; and (3) only reading each local log file once, which makes the construction very efficient. In the process, several concepts are developed for identifying commit symbol cycles and their components, "supported" and "unsupported" segments, and then for resolving these cycles.

Because the present invention looks at limited types of operations, it is easily compatible with existing database systems. The method also incurs very little overhead in constructing the order and supports the construction of both total and partial global transaction orders.

BRIEF DESCRIPTION OF THE DRAWINGS

FIG. 2b shows an example of two connected local log files after performing the first step of FIG. 2a;

FIG. 3a is a flow chart showing the steps of the preferred embodiment of the network merging process used by the main process described in FIG. 2a;

FIG. 3b shows two local log files ready to be merged at a merge point according to several steps of FIG. 3a;

DETAILED DESCRIPTION OF THE INVENTION

Figure 1:
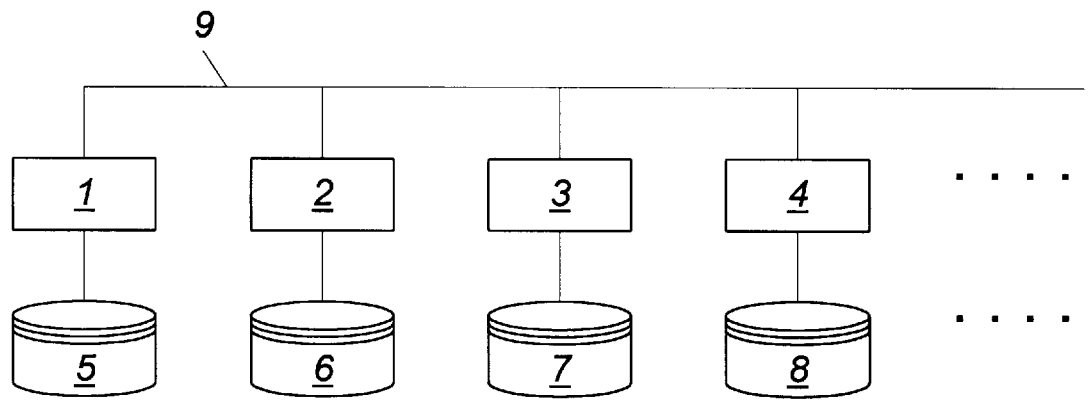
FIG. 1 shows the architecture of a share-nothing parallel database system.
Figure 2A:
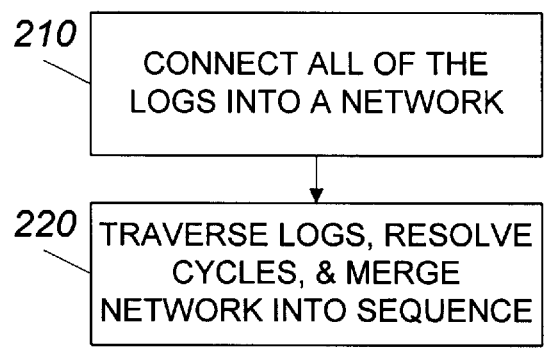
FIG. 2a is a flow chart showing the outline of the main transaction order construction process.
Figure 2B:
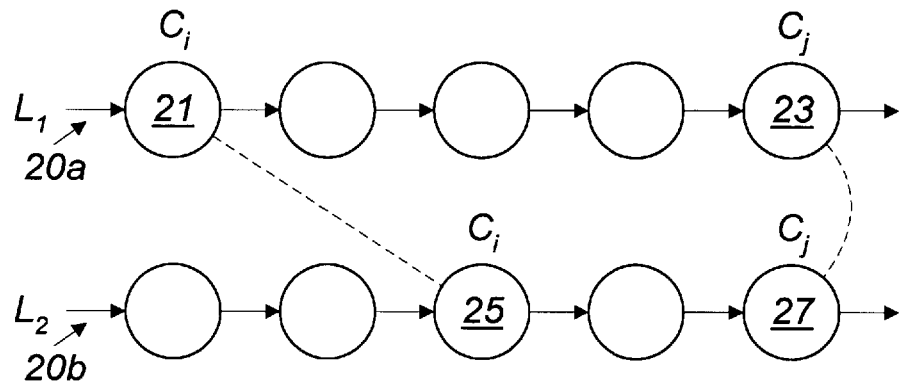

FIG. 2a is a flow chart showing the outline of the main transaction order construction process. The first step 210 creates a network of local log files by connecting the files to each other. This is done by identifying commit symbols, Ci, of the same transaction appearing in multiple log files $L_1$, $L_2$, ..., $L_k$. These $C_i$'s are then connected together and their confluence designates a "merge point" merging log files $L_1$, $L_2$, ...,Lk. A two-local-log file system is depicted in FIG. 2b showing the merge points of the system defined by $L_1$ 20a and $L_2$ 20b. The merge point of $C_i$ consists of commit symbols 21 and 25, and the merge point of $C_j$ consists of commit symbols 23 and 25 (the blank symbols in the figure denote other operations such as votes or commits from other transactions). Next, step 220 encompasses traversing the log files, resolving commit symbol cycles, and merging the network into a sequence. This step is further described below.

Figure 3A:
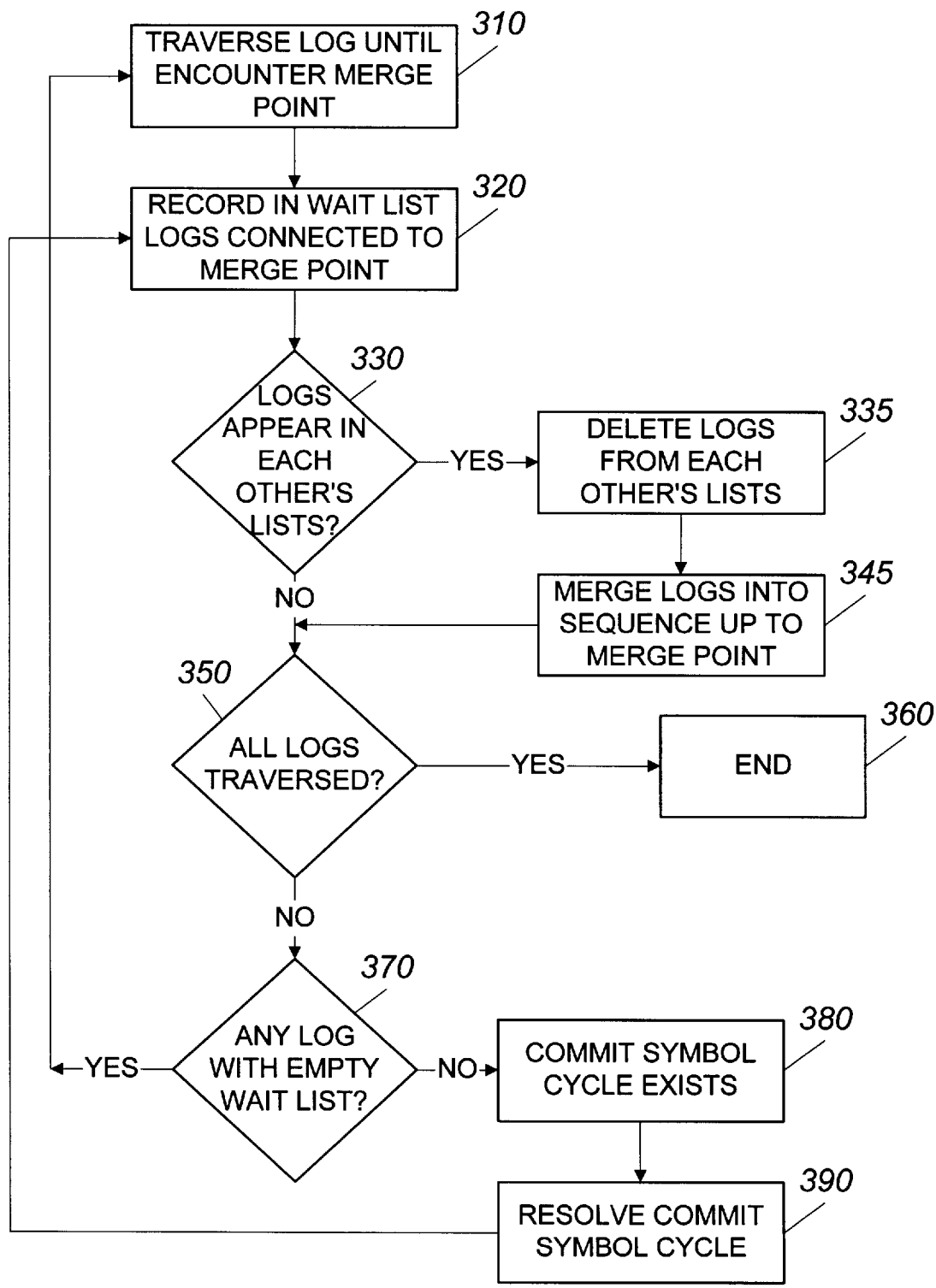

FIG. 3a is a flow chart showing the steps of the network merging process outlined in step 220. A first embodiment of this process (not shown) first traverses all the log files to their ends, resolving commit symbol ambiguities, and then, in another pass-through, merges the unambiguous log files into one sequence. A preferred embodiment both resolves the ambiguities and merges the log files while traversing the log files, thus constructing the order in one pass-through. (Because the first embodiment is less efficient and its functions are subsumed in those of the preferred embodiment, it is not discussed further.) Each local log file has a "current traversal point," initially set to the beginning of the log file, and the log files are traversed in the direction from the beginning of the log file to the end. Associated with each local log file is a "wait list" in which the log file stores information as to which other local log files are connected to it in the network. Each wait list is initially empty.

Figure 3B:
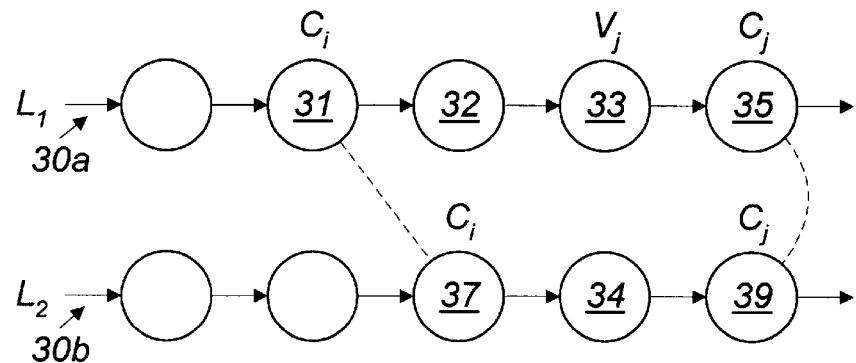

The first step 310 takes an arbitrary log file $L_k$ with an empty wait list and advances the current traversal point until a merge point $C_m$ is encountered. When that happens, the next step 320 records into the wait list of $L_k$ all the other log files merged at that merge point (each log file is denoted ($L_n$, $C_m$)). FIG. 3b shows two connected local log files $L_1$ 30a and $L_2$ 30b and illustrates these two steps 310, 320. Letting $L_1$ 30a be the initial arbitrary log file, both local log files initially having empty wait lists, $L_1$ 30a is traversed until a merge point consisting of $C_i$ 31 in $L_1$ 30a and $C_i$ 37 in $L_2$ 30b is encountered. Thus, ($L_2$, $C_i$) is recorded in the wait list of $L_1$ 30a.

The next steps 330, 335, 345 involve merging the log files that mutually appear in each other's wait lists at a given merge point $C_m$. Step 330 examines the wait lists of the log files that appear in the wait list of $L_1$ 30a. Because only ($L_2$, $C_i$) appears in that wait list, and the wait list of $L_2$ 30$_b$ is initially empty and has not yet been filled, step 330 returns "NO" and the process continues to step 350 to determine if all of the log files have been traversed. If so, the process is complete and proceeds to the end 360. If not, the process in step 370 looks for any other log file whose wait list is still empty.

In the case illustrated in FIG. 3b, the wait list of $L_2$ 30b is still empty. Thus the process returns to the first step 310 and $L_2$ 30b is traversed until the merge point $C_i$ 37 in $L_2$ 30b and $C_i$ 31 in $L_1$ 30a is encountered. Step 320 records ($L_1$, $C_i$) in the wait list of $L_2$ 30b. Now, step 330 returns "YES" because ($L_1$, $C_i$) and ($L_2$, $C_i$) mutually appear in each other's wait list associated with the same merge point.

Figure 3C:
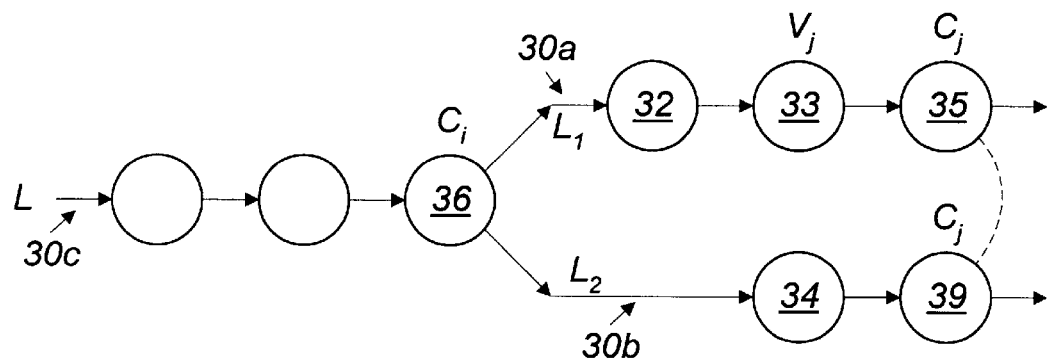
FIG. 3c shows the same two local log files shown in FIG. 3b after merging to a merge point.

The next step 335 deletes the names of the log files from the wait lists of the log files that mutually appear in each other's wait lists. Thus, ($L_2$, $C_i$) is removed from the wait list of $L_1$ 30a and ($L_1$, $C_i$) is removed from the wait list of $L_2$ 30b. Because these log file wait lists only contained the other log file, both wait lists are now empty and the process continues. The next step 345 merges the log files connected to the merge point into a sequence up to the merge point and the merging process is fairly straightforward. The vote and commit symbols of these log files are arranged by arbitrarily interleaving them so long as the relative orders in their original log files are not violated. FIG. 3c illustrates the result of the merge. Now only one combined log file L 30c appears up to and including the merge point $C_i$ 36. The rest of the log files $L_1$ 30a and $L_2$ 30b remain intact; there is still a relative pattern in $L_1$ 30a of symbols 32-33-35, there is still a relative pattern in $L_2$ 30b of symbols 34-39, and the connection between similar commit symbols $C_j$ 35 in $L_1$ 30a and $C_j$ 39 in $L_2$ 30b remains intact. After deleting the logs from the wait lists and merging the log files up to the merge point, the process continues in step 350 to see whether all log files have been completely traversed.

Figure 3D:
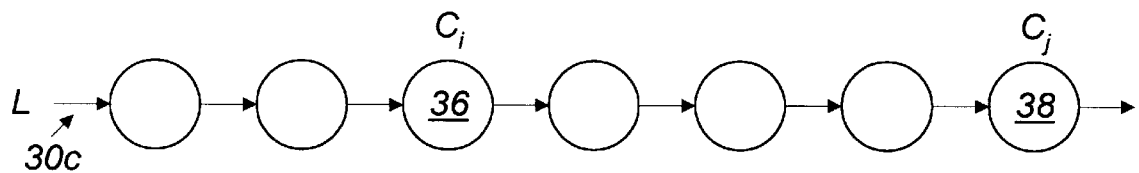
FIG. 3d shows the same two local log files shown in FIGS. 3b and 3c after merging to a second merge point constituting traversal of both local log files.

From $C_i$ 36 the process continues, repeating the previous steps on $L_1$ 30a and $L_2$ 30b, and the traversal encounters a merge point consisting of $C_j$ 35 in $L_1$ 30a and $C_j$ 39 in $L_2$ 30b. This results in the picture in FIG. 3d where the two log files $L_1$ 30a and $L_2$ 30b are merged to the merge point $C_j$ 38 which is the end of both log files. Thus step 350 returns "YES" and the process ends there with one log file L 30c remaining.

Figure 4A:
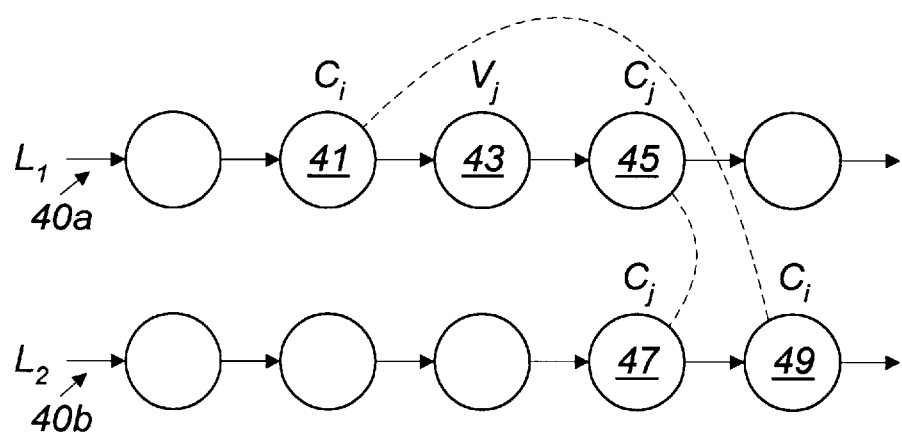
FIG. 4a shows an example of a commit symbol cycle between two connected local log files.

FIG. 4a illustrates a final possibility in the merging process—a commit symbol cycle. Commit symbol cycles occur when different local log files imply different orders of the same two (or more) transactions. Commit symbol cycles are formally defined as follows:

Given a set of local log files, if there exist some commit symbols $C_1, C_2, \ldots, C_{n-1}, C_n$ such that relative patterns $C_1$-$C_2$, $C_2$-$C_3$, ..., $C_{n-1}$-$C_n$ exist in some local log files, and $C_1 = C_n$, we say that there is "commit symbol cycle" or simply a "cycle" consisting of $C_1, C_2, \ldots, C_{n-1}$. Each of $C_k$-$C_{k+1}$, for $1 \leq k \leq n-1$ is called a "segment" of the cycle.

As before, initially the wait lists of $L_1$ 40a and $L_2$ 40b are empty. After choosing an arbitrary log file, say $L_1$ 40a, step 310 traverses it until encountering a merge point, in this case $C_i$ 41 and $C_i$ 49. Step 320 records ($L_2$, $C_i$) in the wait list of $L_1$ 40a, steps 330 and 350 both return "NO, " and step 370 returns "YES" and the process continues with step 310 to traverse $L_2$ 40b until encountering merge point $C_j$ 47 and $C_j$ 45. Step 320 records ($L_1$, $C_j$) in the wait list of $L_2$ 40b. Although $L_1$ 40a and $L_2$ 40b appear in each other's wait lists, the wait lists are not associated with the same merge point—the merge point on $L_1$ 40a is $C_i$ and the merge point on $L_2$ 40b is $C_j$. Thus, step 330 again returns "NO." Because both $L_1$ 40a and $L_2$ 40b have not been traversed to the end, step 350 also returns "NO."

However, both log files have wait lists, so step 370 returns "YES," and step 380 is satisfied—when the traversal of logs is stalled because there is no empty wait list, at least one commit symbol cycle has occurred. Note that for the log files involved in a cycle, they must all stop at a different merge point. In addition to the possibility shown in FIG. 4a involving two log files, a commit symbol cycle will occur, for example, in a three (or more) log file system if $L_a$ appears in the wait list of $L_b$, $L_1$ appears in the wait list of $L_c$, and $L_c$ appears in the wait list of $L_a$.

Figure 5:
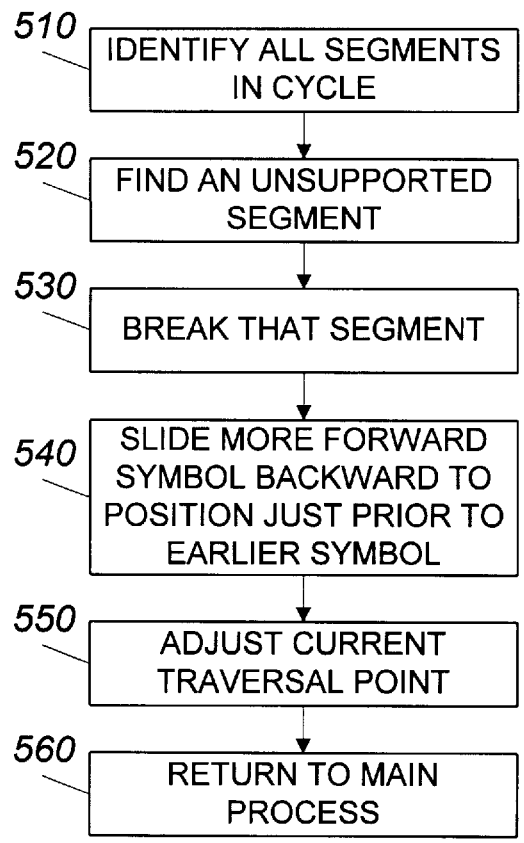
FIG. 5 is a flow chart showing the steps taken to resolve a commit symbol cycle.

When a commit symbol cycle occurs, step 390 resolves the cycle by adjusting the position of commit symbols in at least one of the log files so that a consistent order of transactions is maintained. FIG. 5 is the flow chart showing the commit symbol cycle resolution process. The first step 510 in resolving a commit symbol cycle is to identify all of the segments in the cycle. FIG. 4*a* illustrates a two-segment commit symbol cycle where $C_i$-$C_j$ 41-45 in $L_1$ 40*a* forms one segment of the cycle and $C_j$-$C_i$ 47-49 in $L_2$ 40*b* forms the other segment.

The next step 520 in the resolution process is to find which of the segments is "unsupported." This step requires two related concepts to be defined: "directly supported" and "indirectly supported." First, a segment $C_i$-$C_j$ of a cycle in a local log file is "directly supported" by the serialization implication of the local log file if relative pattern $C_i$-$V_j$-$C_j$ exists in the log file, i.e. if $V_j$ comes somewhere between $C_i$ and $C_j$. In FIG. 4*a*, because there is a pattern of $C_i$-$V_j$-$C_j$ 41-43-45 in $L_1$ 40*a*, the segment $C_i$-$C_j$ 41-45 is a "directly supported" segment.

Figure 6:
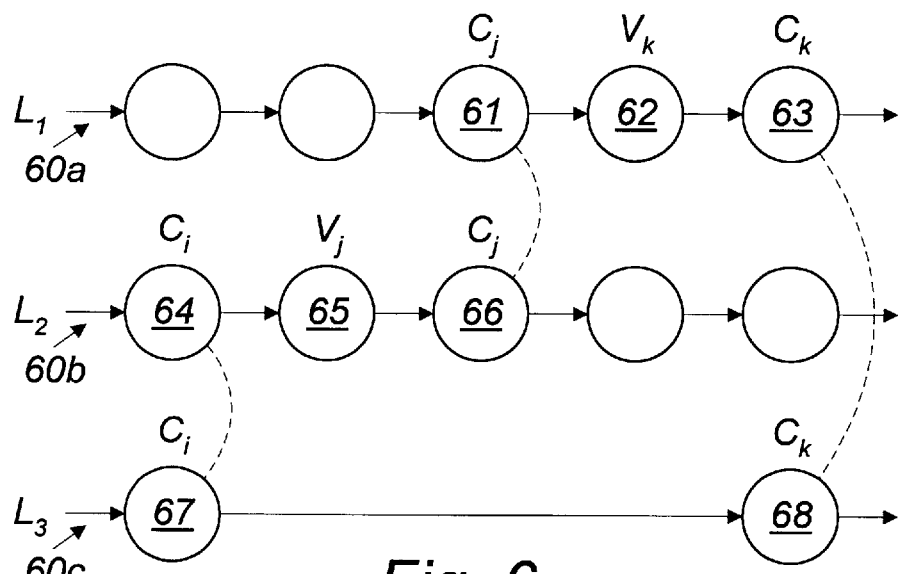
FIG. 6 illustrates an indirectly supported segment.

Second, a segment $C_i$-$C_j$ of a cycle in a local log file is "indirectly supported" by the serialization implication of the local log file if relative patterns $C_i$-$V_{i+1}$-$C_{i+1}$, $C_{i+1}$-$V_{i+2}$-$C_{i+2}$, ..., $C_{i+k-1}$-$V_{i+k}$-$C_{i+k}$, where $C_{i+k}$ 32 $C_j$ exist in some log files, i.e. If via a series of directly supported segments across some log files, $V_j$ comes somewhere between $C_i$ and $C_j$. An example of an indirectly supported segment is shown in FIG. 6. At first glance, segment $C_i$-$C_k$ 67-68 on $L_3$ 60*c* appears unsupported because there is no vote symbol between the two commit symbols. However, there is a path of directly supported segments across log files $L_1$ 60*c*, $L_2$ 60*b*, and $L_1$ 60*a* that show that $C_i$-$C_k$ 67-68 is indirectly supported. This path begins with $C_i$ 67 on $L_3$ 60*c* and continues to $C_i$-$V_j$-$C_j$ 64-65-66 on $L_2$ 60*b* because of the matching $C_i$. Operation $C_j$ 66 then connects with the pattern $C_j$-$V_k$-$C_k$ 61-62-63 on $L_1$ 60*a*. Because $C_k$ 63 on $L_1$ 60*a* is the same operation as $C_k$ 68 on $L_3$ 60*c*, the segment $C_i$-$C_k$ 67-68 on $L_1$ 60*c* is indirectly supported.

These definitions lead to the definition of an "unsupported segment" as a segment that is neither directly nor indirectly supported. In FIG. 4*a*, neither of the two segments is "indirectly supported." Because only $C_i$-$C_j$ 41-45 is "directly supported," segment $C_j$-$C_i$ 47-49 must therefore be "unsupported."

Generally, in a two-segment cycle between two log files $L_1$ and $L_2$, where the segment in $L_1$ is $C_i$-$C_j$ and the segment in $L_2$ is $C_j$-$C_i$, only one of the following cases can be true:

Case 1: There is a pattern $C_i$-$V_j C_j$ in $L_1$, and the segment in $L_2$ is unsupported. In such a case, the serialization implication is i before j.

Case 2: There is a pattern $C_j$-$V_i$-$C_i$ in $L_2$, and the segment in $L_1$ is unsupported. In such a case, the serialization implication is j before i.

Case 3: Neither pattern occurs, and both segments are unsupported. This means $V_i$ and $V_j$ come before both of their respective commits, $C_i$ and $C_j$, in both log files. In such a case, no serialization requirement is implied.

FIG. 4*a* depicts Case 1 and thus i must come before j in the global order. Thus the symbols in $L_2$ 40*b* must be rearranged somehow to achieve that result.

Figure 4B:
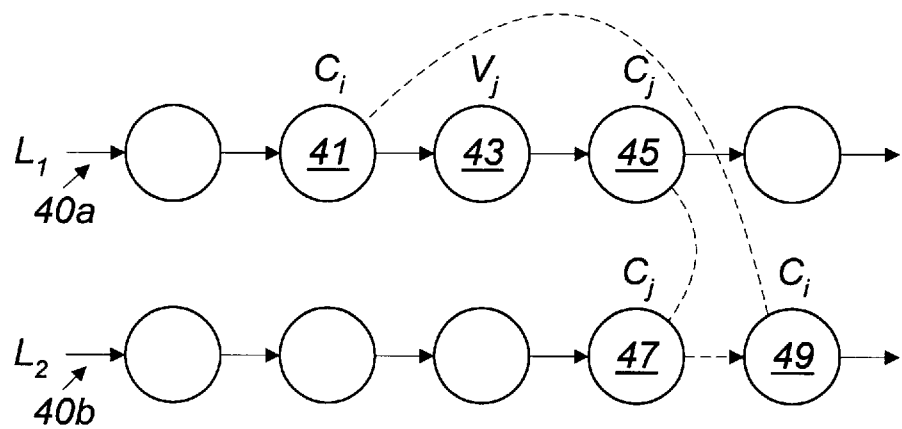
FIG. 4b shows the same two local log files as shown in FIG. 4a with a broken segment.

Once an unsupported segment is found, step 530 "breaks" that segment. FIG. 4*b* depicts the line joining segment $C_j$-$C_i$ 47-49 as broken. In order to resolve the commit symbol cycle, the position of the commit symbols on the unsupported segment must be adjusted so that a global transaction order is maintained. This adjustment is done by a novel technique called "sliding," described in step 540.

When sliding symbols, it is possible that the serialization implication of a local log file will be increased or decreased. If so, several principles must be followed. First, the serialization implication of the local log file should be changed as little as possible. Second, if a piece of serialization implication is created in a local log file, it must already exist in some other local log file. Third, if a piece of serialization implication is deleted from a local log file, it must still exist in some other local log file.

Symbols are adjusted using the following rules. First, within any local log file, the order of any two adjacent commit symbols (or two adjacent vote symbols) can be freely switched as necessary without changing the serialization implication of the log file. It was shown above that the serialization implication between two transactions i andj on any log file L is carried only by the pattern $V_j$-$C_i$-$V_j$-$C_j$ or $V_j$-$C_j$-$V_i$-$C_i$, so switching two adjacent commit (or vote) symbols can neither create nor destroy such a pattern.

Second, within all local log files the order of any two nonadjacent commit symbols is never switched. Switching the order of a vote symbol and a commit symbol without altering the serialization requirement implied by the local log file will either create or destroy a serialization implication. In either case, the serialization implication of the log file is changed.

Figure 4C:
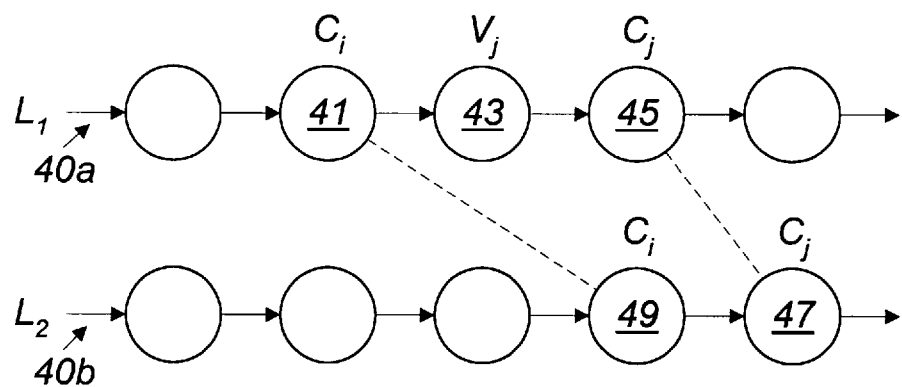
FIG. 4c shows the same two local log files as shown in FIGS. 4a and 4b after the commit symbol cycle is resolved.

Given these rules, sliding of symbols is relatively straightforward. In the two-segment cycle example given above, in Case I where in $L_1$ there is a pattern $C_i$-$V_j$-$C_j$ and the segment in $L_2$ is unsupported, $C_i$ is slid backward in $L_2$ to the position immediately before $C_j$. After the adjustment, $L_2$ will have the pattern $C_i$-$C_j$, and no votes will fall between $C_i$ and $C_j$. This case is illustrated in FIGS. 4*b*–4*c* where $L_1$ 40*a* has a pattern $C_i$-$V_j$-$C_j$ 41-43-45 and the segment $C_j$-$C_i$ 47-49 in $L_2$ 40*b* is unsupported. Thus, in $L_2$ 40*b* $C_j$-$C_i$ 47-49 is broken and the more forward commit symbol, $C_i$ 49, is slid backward to the position immediately before Ci 47. FIG. 4*c* shows the resulting local log files after sliding. Analogously, in Case 2 above where $L_2$ contains the pattern $C_j$-$V_i$-$C_i$ and the segment in $L_1$ is unsupported, in $L_1$ $C_j$ is slid backward to the position immediately before $C_i$.

In Case 3 above where neither pattern occurs in either local log file and both segments are unsupported, either segment can be broken and its forwardmost commit symbol slid backward to a position immediately prior to the other commit symbol. Note that in all three cases, commit symbols only slide backward.

The sliding action above can be shown not to violate the principles stated above for adjusting commit symbols. In the action of sliding a commit symbol $C_i$ to the position immediately before another commit $C_j$, $C_i$ may slide past the symbols of three kinds of transactions. First are transactions whose commit symbols but not vote symbols lie between the original positions of $C_j$ and $C_i$. Second are transactions whose vote symbols but not commit symbols lie between the original positions of $C_j$ and $C_i$. Third are transactions both whose vote symbols and commit symbols lie between the original positions of $C_j$ and $C_i$.

The first situation does not change the serialization implication of the log files because of the rule that adjacent commit symbols can be freely switched. Thus, by a series of switches $C_i$ can be slid past the commit symbols of the first kind of transactions without changing the serialization implication of the log file at all.

The second and third situations do change the serialization implication on the local log file on which the commit symbol is slid. However, these new serialization implications already exist in at least one local log file in the set of given log files. Consider local log file $L_x$ with $C_i$-$V_j$-$C_j$ and local log file $L_y$, and a transaction k whose vote symbol falls between $C_j$ and $C_i$ before the slide (i.e. the relative pattern in $L_y$ is $C_j$-$V_k$-$C_i$). Sliding $C_i$ past $V_k$ will create a relative pattern $C_j$-$V_k$-$C_k$ on $L_y$ (because of the two-phase commit protocol, $V_k$ is always before $C_k$) which seems to create a new serialization requirement i before k. However, because the pattern $C_j$-$V_k$ exists in $L_y$ before sliding, the serialization requirements before k exists, and because $C_i$-$V_j$-$C_j$ exists in $L_x$, a serialization requirement of i beforej exists. These two serialization requirements, i before j and j before k, together imply i before k. Thus the seemingly newly created serialization implication of $L_2$ has already existed in the set of log files before the slide operation.

This leads to a conclusion that the action of backward sliding a commit symbol does not delete any serialization implication. This is so because a serialization implication can be deleted only if a commit symbol that precedes a vote symbol is moved to a position after the vote. This is possible only if the commit symbol is moved forward.

The above example involved a two-segment commit symbol cycle. Similarly, a multi-segment cycle is resolved by breaking one of the unsupported segments and sliding the more forward commit symbol backward to a position immediately before the earlier commit symbol of the unsupported segment.

After the commit symbol cycle is resolved, step 550 adjusts the current traversal point back to the commit symbol that was just slid. Thus, in FIG. 4c, the current traversal point of $L_2$ 40b is $C_i$ 49. Finally, step 560 returns to the main merging process. In FIG. 3a, this means a return to step 320 to record ($L_1$, $C_i$) in the wait list of $L_2$ 40b at current traversal point $C_i$ 49. Now, because ($L_1$, $C_i$) appears in the wait list of $L_2$ 40b and ($L_2$, $C_i$) appears in the wait list of $L_1$ 40a, these two local log files can be merged up to the merge point, as was earlier shown in FIGS. 3b–3c.

While several embodiments have been illustrated and described, other variations and alternate embodiments will occur to those skilled in the art. These variations and embodiments remain within the spirit and scope of this invention.

We claim:

1. A method for constructing a list having a transaction serialization order using at least two local log files in a parallel or distributed database system comprising the steps of:

creating a network of log files by identifying each commit symbol of each transaction in a first local log file with a concomitant commit symbol of said transaction in other local log files having a commit symbol associated with said transaction to thereby designate merge points;

traversing said network; and merging said network into a single sequence, using the designated merge points.

2. The method according to claim 1 wherein said traversing comprises the steps of:

(a) examining a local log file from the beginning until said merge point is encountered;

(b) recording in a wait list of said local log file the names of local log files associated with said merge point;

(c) if all local log files have not been completely examined, finding a local log file with no local log file names in its wait list and continuing with step (a);

(d) if all local log files have local log file names in their wait lists, resolving a commit symbol cycle and continuing with step (c);

(e) continuing until all local log files have been examined.

3. The method according to claim 2 wherein said merging further comprises the steps of:

determining, after the names of local log files connected to said merge point have been recorded in said wait list of said local log file, whether said local log file names mutually appear in said wait lists of said local log files for said merge point;

merging local log files up to said merge point in each local log file in which said local log file names mutually appear in other local log files' wait lists; and deleting from each local log file's wait list the names of mutual local log files that have been merged.

4. A method for constructing a list having a transaction serialization order using a database log file comprising the steps of:

requiring a vote symbol of a transaction in said log file to occur at a time earlier than a commit symbol of said transaction in said log file;

examining the placement of a commit symbol of a first transaction and a vote symbol of a second transaction and a commit symbol of a second transaction;

wherein said first transaction is ordered before said second transaction if said commit symbol of said first transaction occurs at a time earlier than said vote symbol of said second transaction.

5. A method for adjusting the position of a type of operation symbol of a first transaction of a database log file relative to the position of said type of operation symbol of a second transaction of said database log file wherein said type of operation symbol of said first transaction occurs later in time than said type of operation symbol of said second transaction comprising the step of moving said position of said type of operation symbol of said first transaction to a position earlier than that of said type of operation symbol of said second transaction.

6. The method according to claim 5 wherein said position adjustment neither creates nor destroys a serialization implication of said database log file.

7. The method according to claim 5 wherein said type of operation symbol is a commit symbol.

8. A method for identifying a commit symbol cycle in database log files comprising the steps of:

identifying a first local log file and at least a second local log file;

identifying a commit symbol of a first transaction and a commit symbol of a second transaction on said first local log file and denominating a connection between said two commit symbols as a first segment;

identifying a commit symbol of said first transaction and a commit symbol of said second transaction on said second local log file and denominating a connection between said two commit symbols as a second segment;

connecting via a first temporary connection said commit symbol of said first transaction on said first local log file to said commit symbol of said first transaction on said second local log file;

connecting via a second temporary connection said commit symbol of said second transaction on said first local log file to said commit symbol of said second transaction on said second local log file;

wherein traversing in a forward direction on said first segment from the beginning of said first segment to the end of said first segment and then traversing via a said second temporary connection from the end of said first segment to the end of said second segment and then traversing in a forward direction on said second segment leads to said commit symbol of said first transaction on said second local log file.

9. A method for resolving a commit symbol cycle in database log files comprising the steps of:

identifying a commit symbol cycle and a first segment thereof;

determining an unsupported segment by examining if said first segment is unsupported and, if said first segment is not unsupported, continuing to each next segment of said commit symbol cycle until an unsupported segment is found;

breaking said unsupported segment between a commit symbol of a first transaction and a commit symbol of a second transaction wherein said commit symbol of said second transaction is in a position earlier in said unsupported segment than said commit symbol of said first transaction; and sliding said commit symbol of said first transaction backward to a position immediately prior to said commit symbol of said second transaction.

10. The method according to claim 9 wherein a segment is determined by a further method comprising the step of denominating a connection between a commit symbol of a first transaction and a commit symbol of a second transaction on a log file.

11. The method according to claim 10 wherein said segment is determined to be unsupported by a further method comprising the steps of:

determining if said segment is directly supported; and if said segment is not directly supported, determining whether it is indirectly supported;

wherein if said segment is neither directly supported nor indirectly supported, it is unsupported.

12. The method according to claim 11 wherein said segment is determined to be directly supported by a further method comprising the step of traversing in a forward direction along said log file beginning at said commit symbol of said first transaction and ending at said commit symbol of said second transaction, wherein if a vote symbol of said second transaction is encountered before said commit symbol of said second transaction, said segment is directly supported.

13. The method according to claim 11 wherein said segment on a first log file is determined to be indirectly supported by a further method comprising the step of identifying on a second log file a commit symbol of said first transaction, wherein said commit symbol of said first transaction on said second log file is positioned before a vote symbol of said second transaction on said second log file, and wherein said vote symbol of said second transaction on said second log file is positioned before a commit symbol of said second transaction on said second log file.

* * * * *

UNITED STATES PATENT AND TRADEMARK OFFICE
CERTIFICATE OF CORRECTION

PATENT NO. : 5,878,414

DATED : March 2, 1999

INVENTOR(S) : Hsiao et al.

It is certified that errors appear in the above-identified patent and that said Letters Patent is hereby corrected as shown below:

Column 2, line 30, "sharenothing" should be --share-nothing--;
Column 3, line 65, "beforej" should be --before j--;
Column 4, line 16, "beforej" should be --before j--;
Column 5, line 14, "$L_2, \ldots, Lk$" should be --$L_2, \ldots, L_k$--;
Column 5, line 58, "$L_2\ 30_b$" should be --$L_2\ 30b$--;
Column 7, line 27, "$C_{i+k}32C_j$" should be --$C_{i+k} = C_j$--;
Column 7, line 34, "$L_1\ 60c$" should be --$L_3\ 60c$--;
Column 9, line 12, "beforej" should be --before j--.

Signed and Sealed this

Twenty-eighth Day of September, 1999

Attest:

Q. TODD DICKINSON

*Attesting Officer*            *Acting Commissioner of Patents and Trademarks*